US010599300B2

(12) United States Patent
Sauve et al.

(10) Patent No.: US 10,599,300 B2
(45) Date of Patent: *Mar. 24, 2020

(54) ENTRY POINTS TO IMAGE-RELATED APPLICATIONS IN A MOBILE DEVICE

(71) Applicant: Microsoft Technology Licensing, LLC, Redmond, WA (US)

(72) Inventors: Aaron Sauve, Seattle, WA (US); Shamik Bandyopadhyay, Mountain View, CA (US); Kathryn C. Lemson, Redmond, WA (US); Jannes Paul Peters, Berlin (DE); Eric Bennett, Bellevue, WA (US); Ahmad Bilal, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

This patent is subject to a terminal disclaimer.

(21) Appl. No.: 15/232,435

(22) Filed: Aug. 9, 2016

(65) Prior Publication Data
US 2017/0017367 A1 Jan. 19, 2017

Related U.S. Application Data

(63) Continuation of application No. 13/480,138, filed on May 24, 2012, now Pat. No. 9,448,813.

(51) Int. Cl.
G06F 9/48 (2006.01)
G06F 3/0484 (2013.01)
(Continued)

(52) U.S. Cl.
CPC ........ G06F 3/0484 (2013.01); G06F 3/04886 (2013.01); G06F 9/451 (2018.02); H04N 5/23216 (2013.01); G06F 2221/2149 (2013.01)

(58) Field of Classification Search
CPC .... G06F 3/0484; G06F 3/04886; G06F 9/451; G06F 2221/2149; H04N 5/23216
See application file for complete search history.

(56) References Cited

U.S. PATENT DOCUMENTS 5,164,831 A 11/1992 Kuchta
5,903,309 A 5/1999 Anderson
(Continued)

FOREIGN PATENT DOCUMENTS

CN 101556540 A 10/2009
CN 101821707 A 9/2010
(Continued)

OTHER PUBLICATIONS

Firzpatrick, John, "How to Customize Your Android Lock Screen with WidgetLocker", Apr. 10, 2012, https://www.howtogeek.com/111005/how-to-customize-your-android-lock-screen-with-widgetlocker/, 9 Pages (Year: 2012).*
(Continued)

Primary Examiner — Jennifer N To
Assistant Examiner — KC Chen
(74) Attorney, Agent, or Firm — Karin L. Williams; Mayer & Williams PC

(57) ABSTRACT

A method and apparatus is provided for operating a mobile device having stored thereon a plurality of applications ("apps") that are each configured to capture an image. The method includes receiving first user input data requesting invocation of a given one of the applications. The given application is launched by the user. After launching the given application a user interface is presented which serves as an entry point through which all of the image capture applications stored on the mobile device are made available to the user.

17 Claims, 8 Drawing Sheets

(51) Int. Cl.
  *G06F 9/451* (2018.01)
  *G06F 3/0488* (2013.01)
  *H04N 5/232* (2006.01)

(56) References Cited

U.S. PATENT DOCUMENTS

| | | | |
|---|---|---|---|
| 6,930,704 B1* | 8/2005 | Hamada | H04N 13/254 |
| | | | 348/42 |
| 7,707,591 B2 | 4/2010 | Curry | |
| 8,630,623 B2 | 1/2014 | Park et al. | |
| 8,701,045 B2* | 4/2014 | Takahashi | G06F 3/04817 |
| | | | 715/838 |
| 9,699,286 B2* | 7/2017 | Yun | H04M 1/72519 |
| 2002/0054152 A1 | 5/2002 | Palaniappan | |
| 2005/0125744 A1 | 6/2005 | Hubbard | |
| 2007/0157125 A1 | 7/2007 | Peters | |
| 2008/0168474 A1 | 7/2008 | Jeon | |
| 2009/0217173 A1 | 8/2009 | Manheimer | |
| 2010/0031367 A1 | 2/2010 | Leonard | |
| 2010/0223568 A1* | 9/2010 | Quek | G06T 11/60 |
| | | | 715/765 |
| 2010/0269040 A1 | 10/2010 | Lee | |
| 2010/0306705 A1 | 12/2010 | Nilsson | |
| 2011/0016476 A1 | 1/2011 | Raju | |
| 2011/0041078 A1 | 2/2011 | Park | |
| 2011/0047368 A1* | 2/2011 | Sundaramurthy | G06F 3/0481 |
| | | | 713/100 |
| 2011/0119619 A1 | 5/2011 | Fong et al. | |
| 2011/0177792 A1 | 7/2011 | Bruno et al. | |
| 2011/0201362 A1* | 8/2011 | Bregman-Amitai | |
| | | | G06T 19/006 |
| | | | 455/466 |
| 2011/0211758 A1 | 9/2011 | Joshi et al. | |
| 2011/0311104 A1 | 12/2011 | Sinha et al. | |
| 2012/0009896 A1 | 1/2012 | Bandyopadhyay et al. | |
| 2012/0060123 A1* | 3/2012 | Smith | G06F 3/04883 |
| | | | 715/833 |
| 2012/0060149 A1 | 3/2012 | Kimura | |
| 2012/0233571 A1* | 9/2012 | Wever | G06F 3/048 |
| | | | 715/835 |
| 2012/0017178 A1 | 12/2012 | Mulloy et al. | |
| 2012/0311499 A1 | 12/2012 | Dellinger | |
| 2013/0111415 A1 | 5/2013 | Newman et al. | |
| 2013/0187753 A1 | 7/2013 | Chiriyankandath | |
| 2013/0293364 A1* | 11/2013 | Ricci | B60K 35/00 |
| | | | 340/425.5 |
| 2013/0305163 A1 | 11/2013 | Farmer | |

FOREIGN PATENT DOCUMENTS

| | | |
|---|---|---|
| CN | 102402380 A | 4/2012 |
| CN | 202181737 U | 4/2012 |
| EP | 2 278 781 | 1/2011 |
| JP | 2008535084 A | 8/2008 |
| JP | 2010045454 A | 2/2010 |
| JP | 2011004340 A | 1/2011 |
| JP | 2012019362 A | 1/2012 |
| JP | 2012060200 A | 3/2012 |
| JP | 2012511282 A | 5/2012 |
| JP | 2013534121 A | 8/2013 |
| TW | 200943085 A | 10/2009 |
| TW | 201103305 A | 1/2011 |
| TW | 201140418 A1 | 11/2011 |
| TW | 201207757 A1 | 2/2012 |
| WO | 9812868 A1 | 3/1998 |

OTHER PUBLICATIONS

"Office Action Issued in Japanese Patent Application No. 2015-514064", dated Feb. 21, 2017, (12 Pages total).
"Second Office Action Issued in Chinese Patent Application No. 201380026979.3", dated Apr. 10, 2017, (4 Pages total).
"Office Action Issued in Taiwan Patent Application No. 106109445", dated Jan. 10, 2018, 9 Pages.
"Office Action Issued in European Patent Application No. 13728866.8", dated Jan. 19, 2018, 6 Pages.
"Office Action Issued in Japanese Patent Application No. 2015-514064", dated Sep. 7, 2017, 12 Pages.
Hashimoto, Kazunori, "Animation server Maniacs", Published by Shoeisha Co Ltd, First Edition, 1st Printing, May 21, 2012, 5 Pages.
Yoon, et al., "Virtual Lock: A Smartphone Application for Personal Surveillance Using Camera Sensor Networks", Retrieved at «http://ieeexplore.ieee.org/stamp/stamp.jsp?tp=&arnumber=6029895», IEEE 17th International Conference on Embedded and Real-Time Computing Systems and Applications (RTCSA), Aug. 28, 2011, pp. 77-82 (6 pages total).
Qu, et al., "Improving the Efficiency of Run Time Reconfigurable Devices by Configuration Locking", Retrieved at «http://ieeexplore.ieee.org/stamp/stamp.jsp?tp=&arnumber=4484894», Design, Automation and Test in Europe, Mar. 10, 2008, pp. 264-267 (4 pages total).
Ponder, George, "Mango's pictures and camera features come to light", Retrieved at «http://www.wpcentral.com/mangos-pictures-and-camera-features-come-light», Aug. 30, 2011, (11 pages total).
Wientruab, Seth, "iOS security issue [note]", Retrieved at «http://9to5mac.com/2012/03/08/in-ios-5-1-major-security-flaw-with-the-new-lock-screen-camera-slider/», Mar. 8, 2012, (13 pages total).
Plain, Nick, "iOS 5.1 Brings Easier Camera Access to Lock Screen", Retrieved at «http://www.coolsmartphone.com/2012/02/18/ios-5-1-brings-easier-camera-access-to-lock-screen/», Feb. 18, 2012, (19 pages total).
Dsouza, Keith, "How to Quickly Access Camera in iOS5 From Lock Screen", Retrieved at «http://techie-buzz.com/mobile-news/quickly-access-camera-from-lock-screen-ios5.html», Oct. 14, 2011, (8 pages total).
Paul, Ian, "Apple's i-OS 5 vs. Google's Android 4.0 Ice Cream Sandwich", Retrieved at «http://www.pcworld.com/article/242139/apples_ios_5_vs_googles_android_40_ice_cream_sandwich.html», Oct. 19, 2011, (22 pages total).
International Search Report and Written Opinion dated Sep. 20, 2013, issued in connection with corresponding International Application No. PCT/US2013/041478 (10 pages total).
Microsoft, definition of "user interface", Micorsoft Computer Dictionary, Mar. 15, 2002, Microsoft Press, Print ISBN-13: 978-0-7356-1495-6, p. 684 (1 page total).
Microsoft, defintions of application, code segment, and utility, Micorsoft Computer Dictionary, Mar. 15, 2002, Microsoft Press, Print ISBN-13: 978-0-7356-1495-6, pp. 39, 134, 685 (3 pages total).
IEEE 100, The Authoritative Dictionary of IEEE Standards Terms, 7th edition, copyright 2000 by the Institute of Electrical and Electronics Engineers. ISBN 0-7381-2601-2. p. 1242. (1 page total).
"Office Action and Search Report Issued in Taiwan Patent Application No. 102114630", dated Oct. 6, 2016, 8 Pages.
"Final Office Action Issued in U.S. Appl. No. 13/480,138", dated Dec. 19, 2014, 16 Pages.
"Non Final Office Action Issued in U.S. Appl. No. 13/480,138", dated Oct. 5, 2015, 15 Pages.
"Non Final Office Action Issued in U.S. Appl. No. 13/480,138", dated Feb. 25, 2014, 16 Pages.
"Notice of Allowance Issued in U.S. Appl. No. 13/480,138", dated May 10, 2016, 14 Pages.
"Restriction Requirement Issued in U.S. Appl. No. 13/480,138", dated Nov. 7, 2013, 8 Pages.
"First Office Action and Search Report Issued in Chinese Patent Application No. 201380026979.3", dated Aug. 31, 2016, 16 Pages.
"Office Action Issued in Taiwan Patent Application No. 106109445", dated May 31, 2018, 10 Pages.
"Camera Applications Best 3 Expert of Application Selects and Interesting Camera Applications Editorial Department Recommends", Published in Weekly ASCII, ASCII Media Works Co., Ltd., vol. 23, p. 101, Apr. 5, 2011, 4 Pages.
"Special Recommendations! Online Software Special Recommendations! Online Software", Published in I/O, and Incorporated Company Engineering Company, vol. 33, Issue 12, Dec. 1, 2008, 4 Pages.

(56) References Cited

OTHER PUBLICATIONS

"Office Action Issued in Taiwan Patent Application No. 106109445", dated Feb. 18, 2019, 10 Pages.
"Office Action Issued in Japanese Patent Application No. 2018-021146", dated Feb. 19, 2019, 7 Pages.
"Office Action Issued in European Patent Application No. 13728866.8", dated Nov. 29, 2019, 6 Pages.

* cited by examiner

ENTRY POINTS TO IMAGE-RELATED APPLICATIONS IN A MOBILE DEVICE

CROSS-REFERENCE TO RELATED APPLICATIONS

This application is a continuation of U.S. Ser. No. 13/480,138, filed May 24, 2012, entitled, "ENTRY POINTS TO IMAGE-RELATED APPLICATIONS IN A MOBILE DEVICE", now U.S. Pat. No. 9,448,813 which issued on Sep. 20, 2016, which is incorporated herein by reference in its entirety.

BACKGROUND

With the increasing popularity of mobile devices having image-capture functionality, including, for instance, cellphone devices, handheld devices, handheld computers (e.g., tablets), smartphones and PDAs, there is a need for improving the user experience by allowing quick access to the multitude of image-capture and image-processing applications ("apps") that a user may have downloaded or otherwise installed on their mobile devices.

For example, specialized image-capture applications exist which apply frames, different filters and lenses and special effects to pictures. For instance, some applications provide double-exposure pictures, panoramic pictures, three-dimensional (3D) pictures or vintage style pictures.

Therefore, there exists opportunities for improvement in technologies to allow mobile device users quick and convenient access to their image-capture and image processing applications

SUMMARY

Apparatus, computer-readable storage media, and methods are disclosed for allowing mobile device users to easily access all of their image-capture applications within the native image-capture application with the click of a button. In one implementation, an application launch button is provided which allows a user to launch an image-capture application screen which lists all of the image-capture applications that are available to the user on the mobile communication device. The application launch button may be made available in both native image-capture applications (applications provided by the original equipment manufacturer) and, additionally, in third-party applications. In this way the application launch button serves as an in-context entry point to all available image-capture applications, allowing the end user to easily switch from one image-capture application to another.

In one particular implementation the end user can access some or all of the image-capture applications with the click of button even when the device is locked (i.e., in an above-locked state). However, in some cases the image-capture applications that are available even when the mobile device is locked may only provided limited functionality. That is, some functions of the applications may be disabled when the mobile device is locked.

In another particular implementation, the mobile device can display a simple image representation (e.g., a JPEG or MP4) of an picture that was captured in a rich media format. Such rich media formats contain additional information which allows the image to be presented in any of a variety of formats such as a three-dimensional format or a panoramic format, for example. In addition, the mobile device may present the simple representation to the user, along with a link back to the image-related application that acquired the image. In this way the user can quickly launch a rich media application both to capture and to view a complete rich media representation of the image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
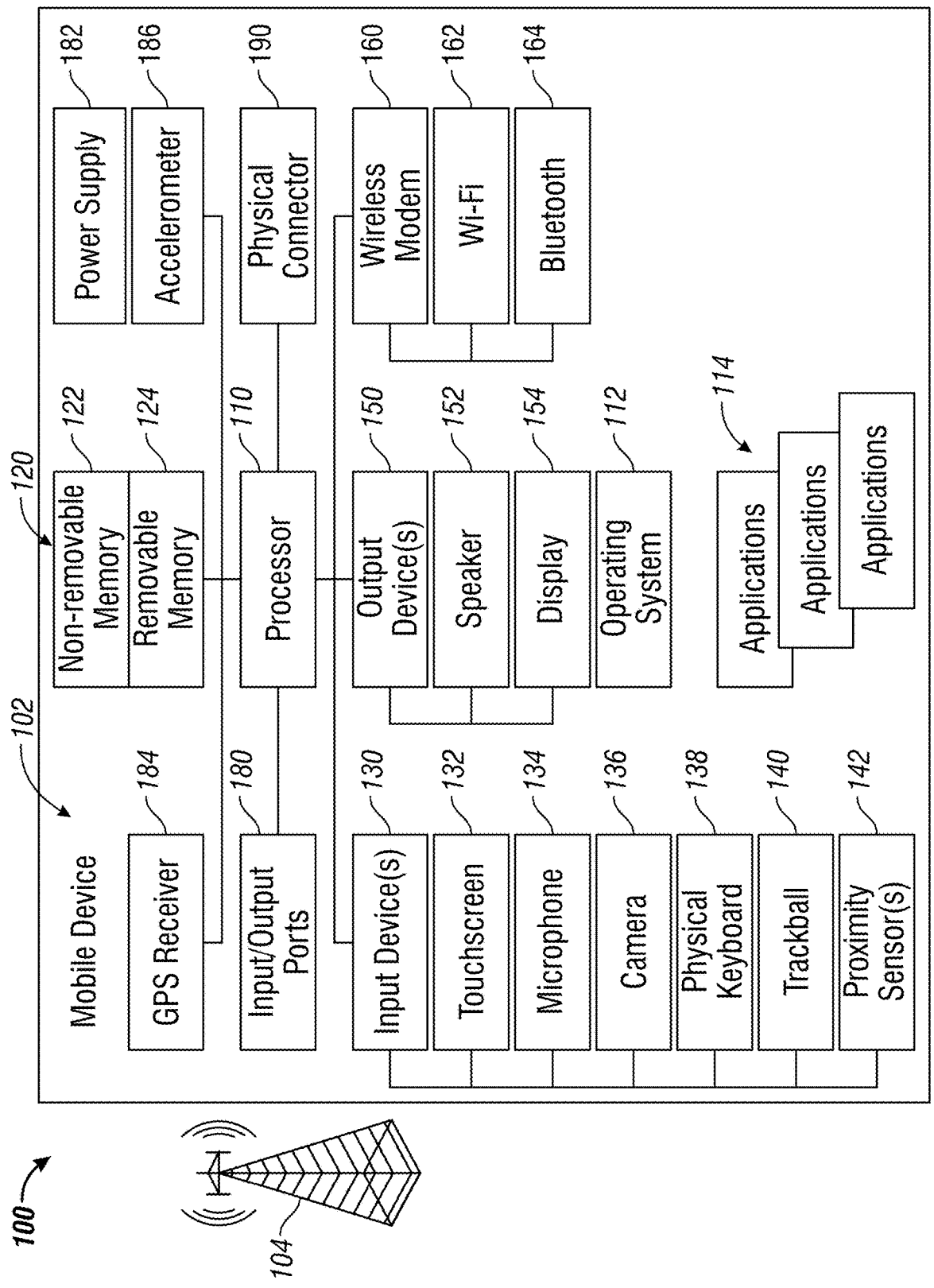
FIG. 1 is a system diagram depicting an exemplary mobile device, including a variety of optional hardware and software components.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed things and methods can be used in conjunction with other things and methods. Additionally, the description sometimes uses terms like "produce," "generate," "select," "capture," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable storage media (e.g., non-transitory computer-readable storage media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed method allow third party developers to access several services that augment the user experience and supply basic user interface and Application Programming Interface (API) capabilities to the developers, allowing them to efficiently create applications that are compatible with the system. As used herein, the term "service" refers to a utility, function or program code module that performs some task for a calling process, which has no user interface and which is accessed programmatically through a call interface such as an API.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

As used in this disclosure, above-lock means that a device is in a state where at least some functions of the device are not accessible to a user as a result of the device being in the above-lock (or "locked") state. As used in this disclosure, below-lock means that a device is in a state where additional functionality is available that is not accessible to a user in the above-lock state. In addition, a device may be described as having other states that are not necessarily mutually exclusive with the above-lock or below-lock authentication states. For example, in some embodiments, a device can be in either a low-power state or an active state while concurrently being in an above-lock state. Similarly, in some embodiments, a device can be in a below-lock state while concurrently being in a low-power or active state.

Software applications, sometimes referred to as "apps" in the market, constitute a driver for the sale and popularity of mobile devices. The computing power and functionality of mobile devices are often used to download and use the applications available for download from various websites. Applications are generally executable programs that are downloaded and executed on the mobile device to perform various functions, such as to provide sports news, access to electronic mail (email), access to the Global Positioning System (GPS), playing video games, playing music and video, and the like.

As used herein, the term "image-related application" will be used to refer to an application that can capture an image and/or process an image. That is, both an image-capture application and an image-processing application may be referred to as an image-related application. Moreover, since video may be treated as a sequence of still images, the terms "image" and "video" will often be used interchangeably with one another unless the context clearly indicates otherwise.

As previously mentioned, users now have access to many image-capture applications, and consequently often download several such image-related applications for use in different circumstances. To gain access to these applications the user typically has to locate the application of interest among all the other applications stored on the mobile device. Searching for a particular image-related application that is mixed not only with other image-related applications but also with other types of applications can make it difficult to find the image-related application of interest. This process can become unwieldy and extend the time needed before the user can take a picture, which can be inconvenient and even cause the user to miss capturing a desired image.

The disclosed technology relates to the accessibility of image-related applications on a mobile device. Certain embodiments of the disclosed technology permit the end user to easily access all of their image-related applications within the native image-related application with the click of a button. Another exemplary approach allows the end user to access at least a subset of the image-related applications with the click of button even when the device is locked.

While reference is made throughout this document to image-capture apps or applications, more generally the disclosed technology relates to any executable code segments that are capable of acquiring an image. For instance, the image acquisition functionality may be implemented using a dynamic link library (DLL) that is hosted in another application.

I. Example Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, tablet or other handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102, including power states, above-lock states, and below-lock states, and provide support for one or more application programs 114. The application programs can include common mobile computing applications (e.g., image-related applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130 for responding to inputs from users and other sources. Such input devices may include a touch screen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touch screen 132 and display 154 can be combined into a single input/output device.

In some implementations the various input devices 130 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft is working include touch sensitive displays, voice and speech recognition, intention and goal understanding, motion gesture detection using depth cameras (such as stereoscopic camera systems, infrared camera systems, rgb camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

Figure 2B:
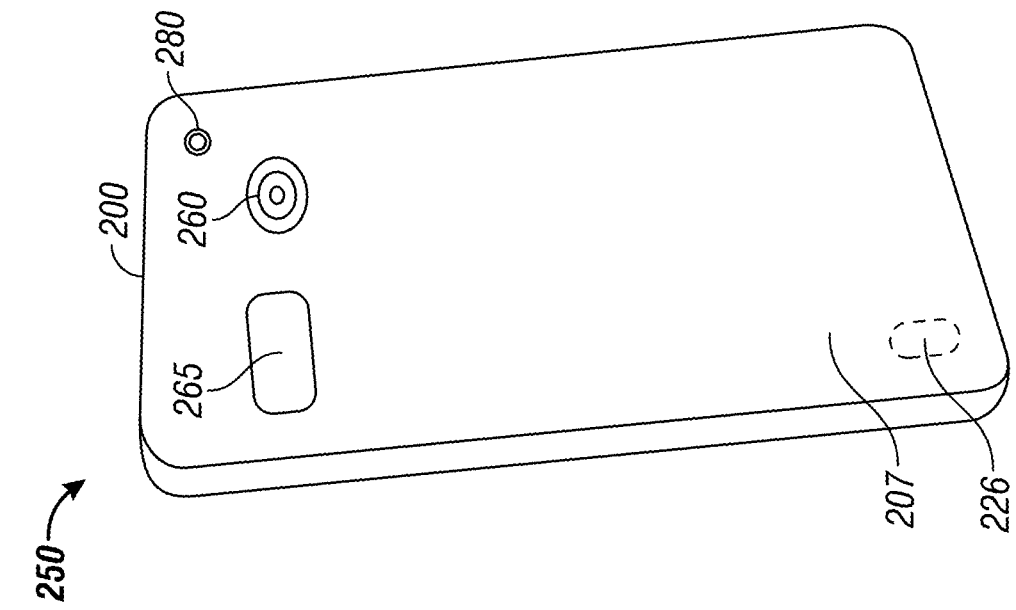
FIGS. 2A and 2B illustrate a generalized example of a mobile device, including a touch screen display, image-capture device, proximity sensors, and buttons.
Figure 2A:
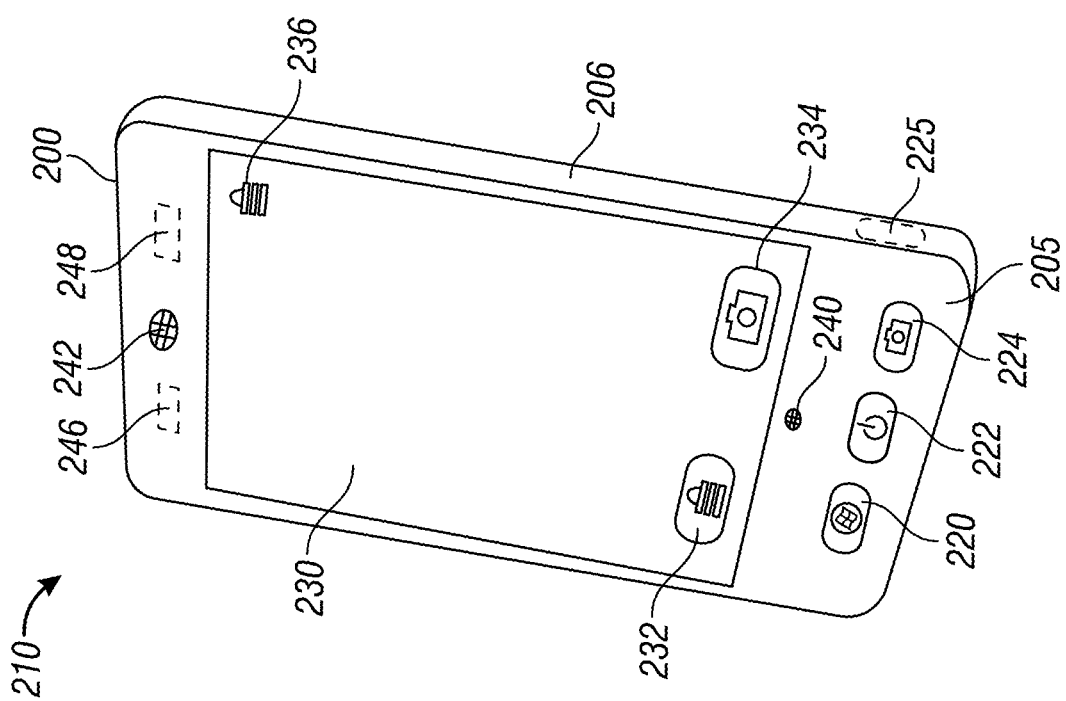

FIG. 2A depicts a front view 210 of an example mobile device 200, while FIG. 2B depicts a rear view 250 of the mobile device. As shown, the mobile device 200 includes several hardware buttons, including a home button 220, a power button 222, and a camera shutter (image-capture) button 224. Also depicted is a touch screen display 230, which is shown displaying a touch screen unlock button 232, a touch screen camera shutter button 234, and a locked-mode indicator 236.

The mobile device 200 includes a microphone 240 and speaker 242, along with two proximity sensors 246 and 248, situated below the surface of the mobile device. In some examples, a single, or three or more, proximity sensors can be used. Any suitable proximity sensor(s) can be employed. In some examples, the proximity sensors 246 and 248 emit an infrared beam and receive a reflected infrared beam, which is reflected off the surface of a nearby object that has been illuminated by the emitted infrared beam. An intensity measurement, or other measured property for the received beam, can be used to determine whether an object is in proximity with the mobile device 200.

In other examples, an image sensor coupled with a camera lens 260 can be used as a light sensor to detect an object in proximity with the mobile device 200. For example, objects in proximity with the mobile device 200 can be determined using light received through the camera lens 260 with an image sensor based on CMOS, CCD (charge-coupled device), or other suitable technology. In some examples, only a few rows, columns, or pixels of the image sensor are active when checking proximity, in order to reduce power consumption.

The camera shutter button 224 of the mobile device 200 may be a dedicated dual-action camera shutter button, with the ability to detect "half-press" and "full-press" as distinct, separate actions. As is readily understood to those of skill in the art, a half-press refers to the partial actuation of a button or other control, while a full-press refers to a further actuation of the button or control past a determined limit. In some examples, the dual action camera shutter button 224 is associated with the following attributes. When a half-press is detected, input data is received with the mobile device that is associated with auto-focus functionality. When a full-press is detected, input data is received that is associated with camera invocation and image capture. In some examples, the end user can set an option to determine whether or not input data resulting from a half-press or full-press of the camera button initiates functionality when, e.g., the display 230 is turned off or the device is in standby mode. While the camera shutter button 224 is shown located on a front surface 205 of the mobile device 200, in other examples, a camera shutter button can be positioned at alternate locations. For example, the camera shutter button 224 can be located at location 225 (on a side surface 206) or location 226 (on a rear surface 207), respectively, of the mobile device.

Turning to the rear view 250 shown in FIG. 2B, the example mobile device 200 includes the camera lens 260 and an electronic flash 265. In some examples, there is no flash present in the mobile device 200. The individual components (e.g., the hardware buttons 220, 222, and 224, microphone 240, speaker 242, touch screen display 230, camera lens 260 and flash 265) can be coupled to a mobile device chassis (not shown), which is connected to internal components of the mobile device 200, for example: one or more processors, a piezoelectric actuator, a power supply, and a modem.

As shown in FIGS. 2A and 2B, there are several considerations that can be made in the placement of components on the mobile device 200, such as the home button 220, power button 222, camera shutter button 224, the camera lens 260, electronic flash 265, proximity sensors 246 and 248, and the photodiode 280. For example, it is desirable that the placement of the camera shutter button 224 enables or even encourages a user to naturally position the mobile device 200 in a landscape position when capturing images. It is also desirable that the camera shutter button 224 be positioned such that operation of the button is facilitated using an index finger or thumb. For example, the camera shutter button 224 as shown can be easily accessed with a user's right thumb while capturing an image with the mobile device 200 in a landscape position. In other examples, the camera shutter button 224 can be moved to other suitable positions, for example, locations 224 or 226. It is also desirable that the camera shutter button 224 and/or power button 222 be positioned to avoid accidental actuation, in order to mitigate the chance that an image capture application will be launched inadvertently.

It should be noted that any reference herein to a button may refer to a physical or virtual button. Moreover, more generally, instead of a button, any suitable user interface may be provided to receive user input data.

II. Example Mobile Device Image Capture Application

Figure 3:
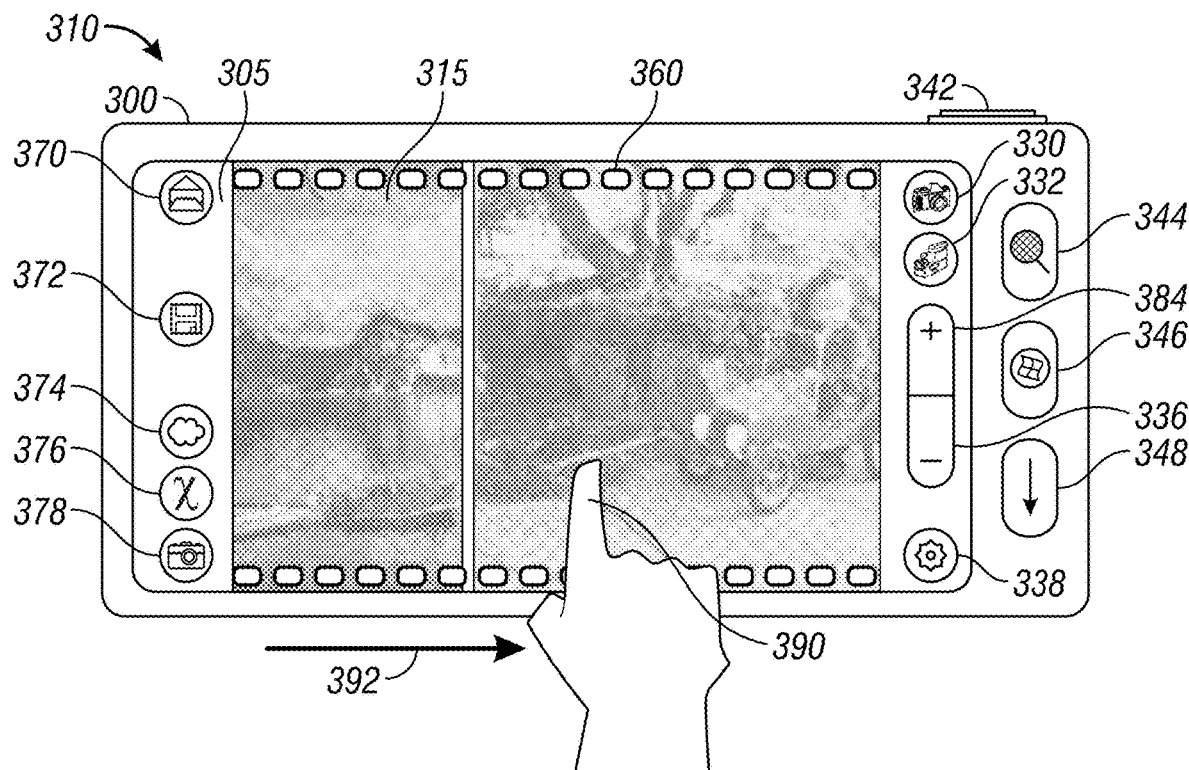
FIG. 3 illustrates a generalized example of a mobile device while providing an image-capture application.

FIG. 3 depicts a front view 310 of an example mobile device 300 after capturing an image 315 using a camera (not shown) coupled to the mobile device. The image may be been captured using a native application or a third party application. As shown, the display 305 of the mobile device 300 includes buttons or controls 330, 332, 334, 336, 338, 370, 372, 374, 376 and 378, which can be used to control the image-capture functionality. These controls include a still image capture mode button 330 (highlighted to indicate that still capture is the currently selected capture mode), a video capture mode control 332, zoom-in and zoom-out controls 384 and 336, an options control button 338, email image button 370, save image button 372, upload image button 374, delete image button 376 and application launch button 378.

The mobile device 300 also includes several hardware buttons, including a camera shutter button 342 located on a side surface of the mobile device, as well as a search button 344, a home button 346, and a back button 348, which are located on a front surface of the mobile device. These hardware buttons 342, 344, 346, and 348 can be used for invoking and/or executing various operations using the mobile device 300. For example, camera shutter button 342 can be used for invoking and/or executing an image capture application, as well as controlling functions within the image capture application, such as autofocusing and/or operating a camera shutter. Search button 344 can be used to invoke and/or execute a user interface for searching data. Home button 346 can be used for navigating software functionality on the mobile device 300 by, for example, setting the mobile device to a home screen state, or invoking other assigned functionality. Back button 348 can be used for navigating software functionality by, for example, requesting a previously requested object that was viewed using the mobile device 300.

Application launch button 378 is used to launch or otherwise execute an image-related application screen which lists or otherwise presents all the image-related applications that are available to the user on the mobile communication device. The end user may execute or launch the applications directly from the screen. These image-related applications may include both native image-related applications as well as third party image-related applications. In this way application launch button 378 serves as an in context entry point to all available image-related applications, allowing the end user to easily switch from one image-related application to another. For an application to be included in this presentation of image-related applications, developers may be required to include in their image-related applications suitable API calls or the like which bring up the image-related application screen.

Figure 4:
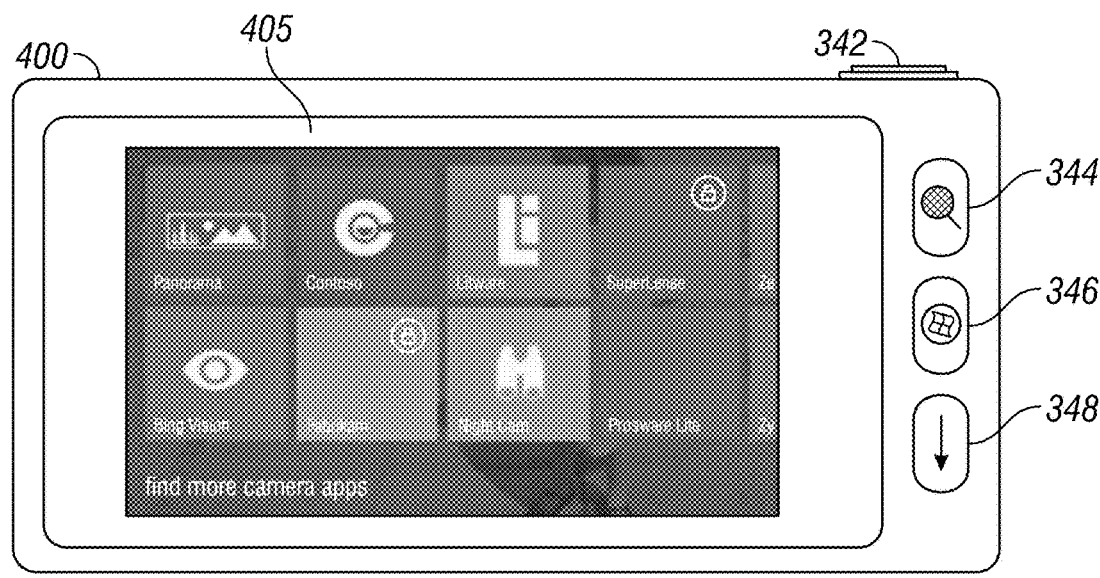
FIG. 4 illustrates a generalized example of a mobile device while presenting a single point of entry to all available image-capture applications.

FIG. 4 shows an example of an image-capture screen 405 that may be presented to the user on the display of mobile device 400 after pressing button 378. The image-related applications which are listed in this example include the native camera application, Panorama, Contoso, Litware, Superlense, Bing Vision, Fabrikam, Night Cam and Prosware Lite. In addition to serving as a single point of entry to all available image-related applications, image-related application screen 405 may allow the end user to perform other functions. For example, as shown, a link may be provided (designated in FIG. 4 as "find more camera apps") which directs the user to an application marketplace from which the user can purchase or otherwise obtain additional image-related applications. In addition, in some embodiments the screen 405 may allow the user to designate one of the image-related applications, including any of the third-party applications, as the default application or as one of a short list of "favorites."

Referring again to FIG. 3, the mobile device 300 is shown displaying an example "camera roll" application, which allows a user to see previously-captured images (e.g., images 315 and 360) by sliding a finger 390 in the direction shown by the arrow 392, which moves images 315 and 360 in the direction of finger motion across the display 305. As shown, film "sprocket holes" can be displayed on the images 315 and 360 to emphasize the camera roll metaphor (e.g., displaying images in a strip similar to a traditional film camera). Using a camera roll allows a user to swipe a finger across a touch screen and thereby move the image in the direction of the swipe (or a drag or flip) and allows a user to see previously taken photos.

Although the controls described above in connection with FIGS. 3 and 4 are shown as being displayed on a touch screen, some or all of the controls can be implemented using hardware buttons or other user interface devices, including any of the aforementioned NUIs.

As previously mentioned, in some implementations the end user is able to access some or all of the image-related applications with the click of a button (physical or virtual) even when the device is locked. That is, in these embodiments the button 378 can be used to access predetermined ones of the image-related applications in an above-lock mode. In some embodiments the image-related applications that are available above-lock may be specified by the end user or, in an enterprise environment, by a corporate IT department.

Figure 6:
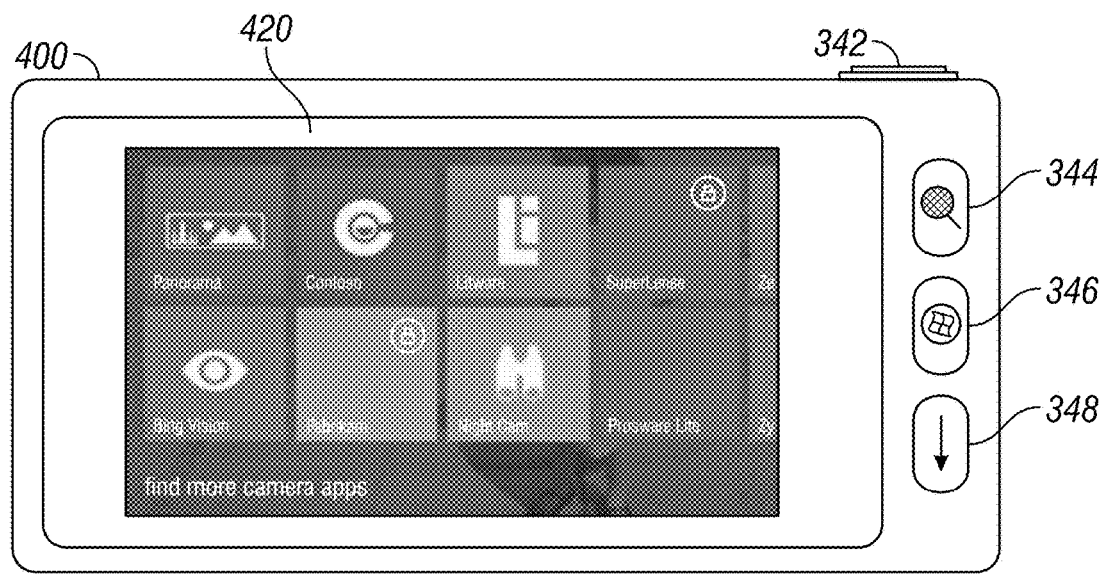
FIG. 6 illustrates a generalized example of a mobile device while presenting a single point of entry to all available image-capture applications when the mobile device is in an above-lock state.

FIG. 6 shows an example of a screen 420 on mobile device 400 that may be presented to the user after pressing application launch button 378 when the camera is in above-lock mode. A distinct icon is superimposed over those image-related applications which are unavailable above-lock. In this example the Superlense and Fabrikam applications are not available above-lock.

Figure 5:
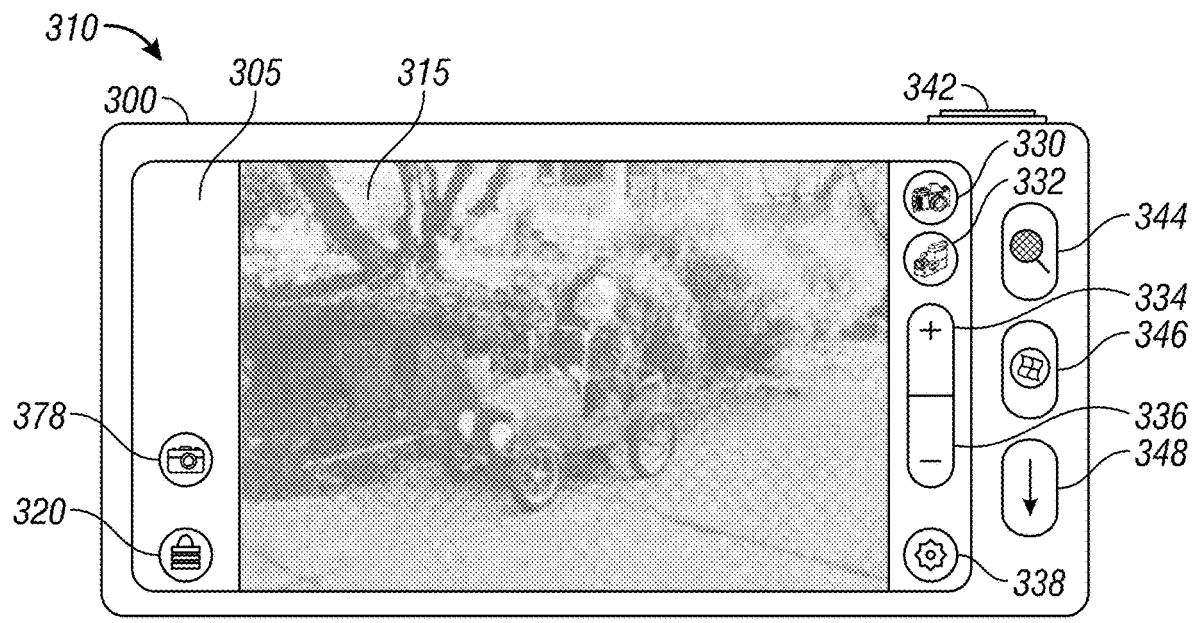
FIG. 5 illustrates a generalized example of a mobile device while providing an image-capture application.

As shown in FIG. 5, the mobile device 300 is depicted after capturing an image 315 using a camera (not shown) coupled to the mobile device while the device was in above-lock mode. As shown, the display 305 of the mobile device 300 also includes an above-lock indicator 320, along with controls 330, 332, 334, 336, and 338, which can be used to control a subset of the image-capture functionality available in below-lock mode. It should be noted that other controls which are available in a below-lock mode (see FIG. 3) are not available in above-lock mode. In particular, in this example, email image button 370, save image button 372, upload image button 374, and delete image button 376 are not available in above-lock mode. However, in this example application launch button 378 is available above-lock to launch a screen which presents all the image-related applications that are available to the user on the mobile communication device when in above-lock mode.

Examples of functionality that may be allowed by an image-related application when the mobile device is in the above-lock state may include one or more of the following: functionality associated with the viewfinder (capture mode) of an image-related application to provide photo capture, video capture, display of a most-recently captured photograph (i.e., a "confirmation image"), and adjustment of image-capture settings, such as flash, zoom, autofocus, white balance, and other such image operations. The available viewfinder functionality in the above-lock state typically includes operations that would not compromise a user's privacy if accessed by an authenticated user.

Furthermore, other functionality normally available in below-lock state(s) can be disabled in above-lock state(s). For example, auto-upload of images can be disabled in the above-lock state to prevent accidently- or undesirably-captured photographs from being uploaded to a remote server or computing cloud. Other functions that may be disabled include delete image, send to, use as, view image gallery, and other such private image operations.

An image-related application, or certain functionality provided by an image-related application, may not be available above-lock if it requires other capabilities of the mobile device which are unavailable in an above-lock mode. For instance, this may occur if an image-related application requires access to an e-mail or contacts application, which are themselves not available in an above-lock mode.

In some examples, the user can proceed to an authentication screen from the above-lock limited-feature image-related application, and, after being successfully authenticated, return to the full-featured application that is available only when in a below-lock state.

III. Example Mobile Device Settings

Figure 7:
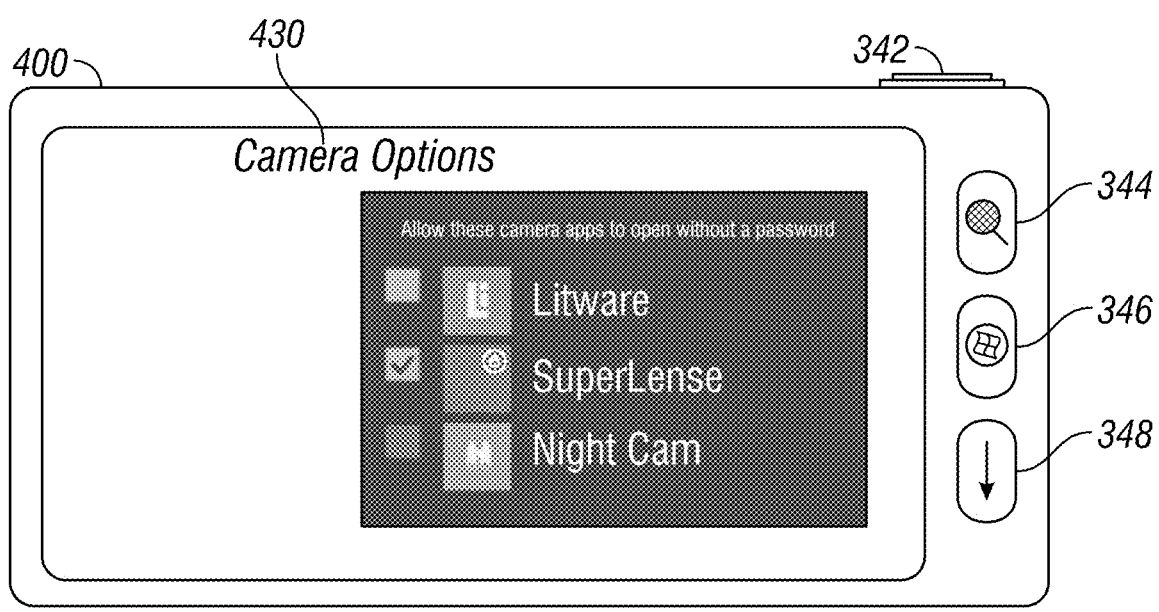
FIG. 7 illustrates a generalized example of a mobile device while presenting image-capture application settings.

FIG. 7 depicts an example of a mobile device displaying an options screen 430. The options screen 430 provides a menu that allows the user to specify which image-related applications, if any, may be available above-lock. In this example the end user has indicated that the Superlens application is to be available above-lock. In addition, for security reasons, an IT policy requires that the Night Cam application is only to be made available with a password. Accordingly, this application is grayed out and the end user is not able to select it for use above-lock.

IV. Image-Related Applications Employing Rich Media Data

Image-related applications are now available which acquire data not only in basic video formats such as JPEG and MP4, for example, but which also acquire and store additional backing data associated with the acquired images. For instance, an image-related application that renders a three-dimensional image generally stores JPEG data and backing data that is used to form a three-dimensional model from the JPEG data. Similarly, an image-related application that renders a panoramic image generally stores JPEG data and backing data that is used to form the panoramic image from one or more JPEG images. Accordingly, the basic video data along with the associated backing data, which may be referred to as rich media data, is used to present the image in the intended manner (e.g., as a three-dimensional image or a panoramic image).

Figure 10:
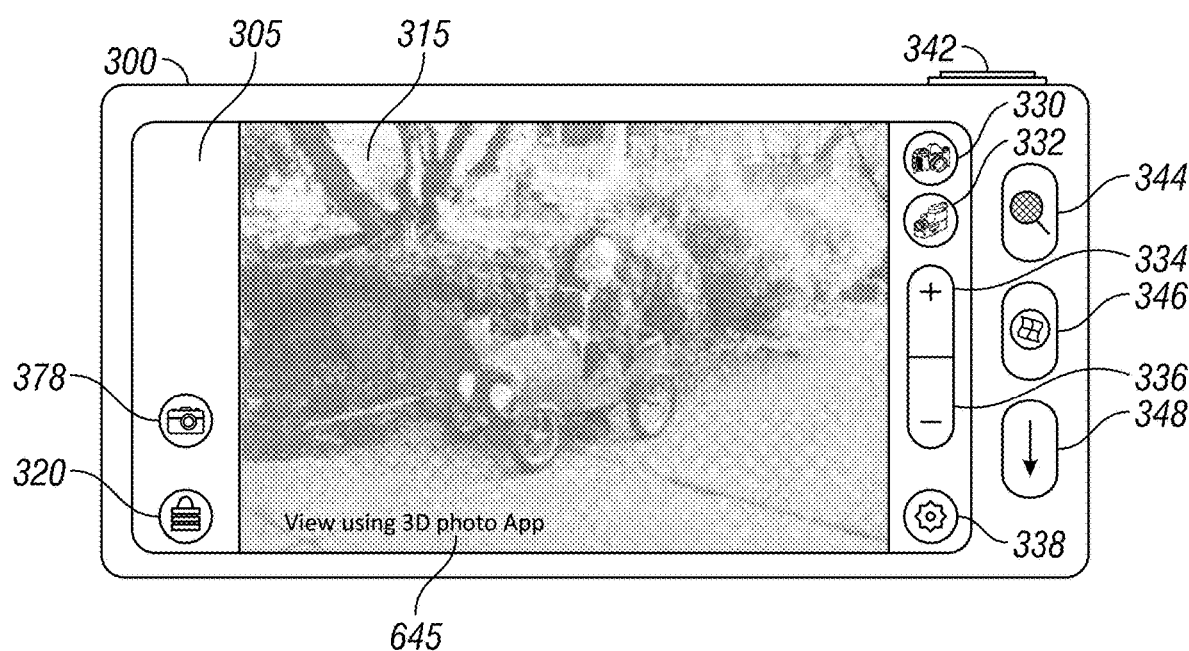
FIG. 10 shows a generalized example of a mobile device presenting a basic representation of a rich media image along with a link back to the application ("3D Photo Application") which captured the image.

In some embodiments of the disclosed technology the camera roll, which allows the user to see previously-captured images, is only capable of saving and presenting data in one of the basic image and video formats. Consequently, the camera roll may not be able to render the images as intended using the rich media data. Rather, the camera roll may only be able to render a representation that uses the basic image and video format portion of the rich media data. In this case the camera roll may present the basic (e.g., JPEG, MP4) representation to the user, along with a link back to the image-related application that acquired the image. For instance, FIG. 10 shows a basic representation of a rich media image along with a link 645 back to the application ("3D Photo Application") which captured the image. In this way the user can quickly view the complete rich media representation of the image though the image-related application. Moreover, in this way the camera roll can now serve as a single entry point for all images, whether or not they include rich media data. As a result the user can render a complete representation of the image without having to search through all of the applications available on the mobile device simply to find the application that acquired the image. If the rich media data is stored separately from the data in the basic representation, some scheme (such as the use of a unique identifier) may be used to re-associate the two types of data when the rich media representation is to be rendered.

In addition to viewing the basic representation without accessing the original application, the user may be able to share the basic representation using conventional sharing applications.

V. Lock and Authentication Screens

As discussed above, certain image-related applications, and/or some functions offered by certain image-related applications, may not be available in an above-lock mode. If a user attempts to access such an application or function while above-lock, the application may make a call to the unlock dialog box API to switch to a below-lock mode. This call brings up one or more screens that allow the user to unlock the mobile device. An example of such a screen is shown in FIGS. 8A and 8B.

Figure 8A:
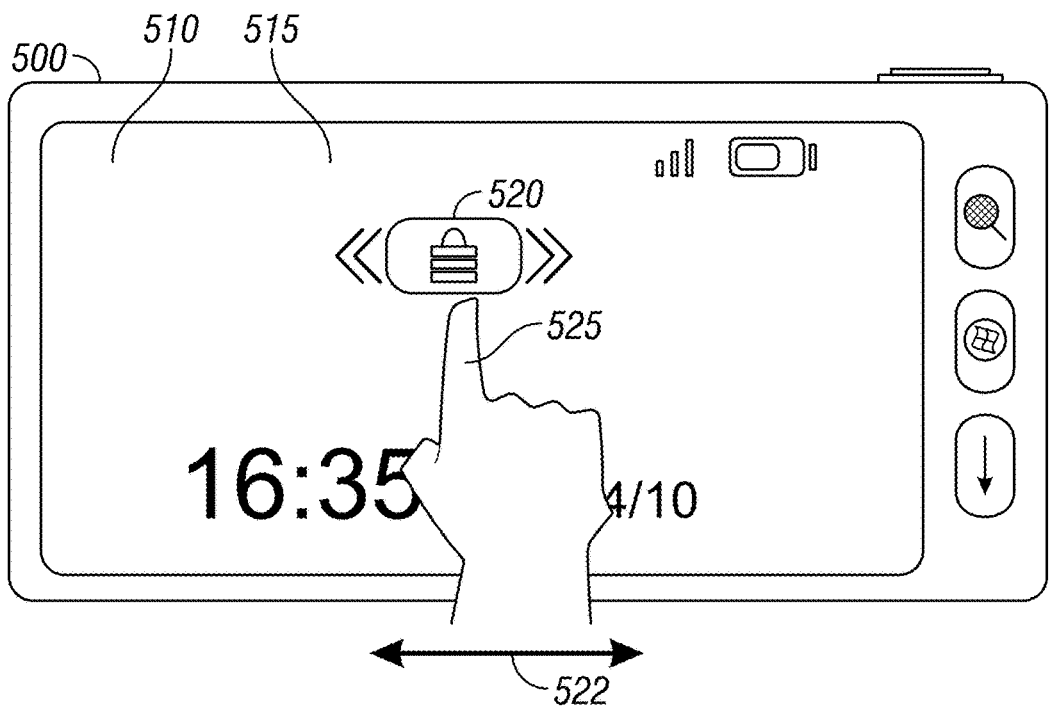
FIG. 8A illustrates a generalized example of a mobile device while presenting a lock screen.

FIG. 8A depicts a mobile device 500 having a touch screen display 510, which is displaying a lock screen 515, including an unlock slider control 520. A mobile device user can slide/drag a finger 525 in the direction indicated by the arrows displayed with the unlock slider control 520 (finger motion is in either of the directions indicated by the arrow 522) in order to request the device to present an authentication screen, for example, as shown in FIG. 8B. Although the authentication screen shown in FIG. 8B uses a PIN pad, other techniques can be used, for example, fingerprint or voice recognition.

Figure 8B:
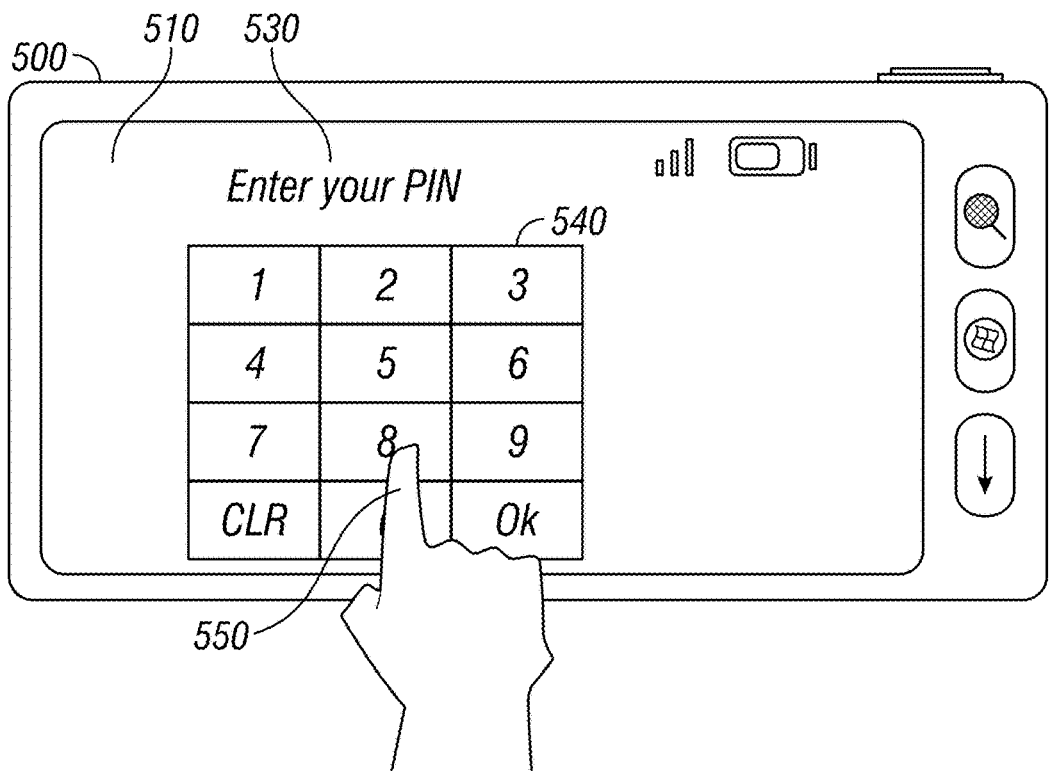
FIG. 8B illustrates a generalized example of a mobile device presenting an authentication user interface.

FIG. 8B depicts the mobile device 500 of FIG. 8A after the user slides a finger on the unlock slider control 520. As shown, the mobile device 500 presents an authentication screen 530 including a PIN pad 540 on the touch screen display 510. The user can enter a PIN (e.g., a four-digit sequence of numerals) using a finger 550 on the pin pad 540. If the PIN entered matches a stored PIN, the user is successfully authenticated, and the device can enter a below-lock (unlocked) state.

One the device enters the below-lock state the user will be returned to the application that the user was attempting to access in the above-lock state. At this point, however, the full functionality of the application will now be available.

VI. Example Invocation of Image-Related Application

Figure 9:
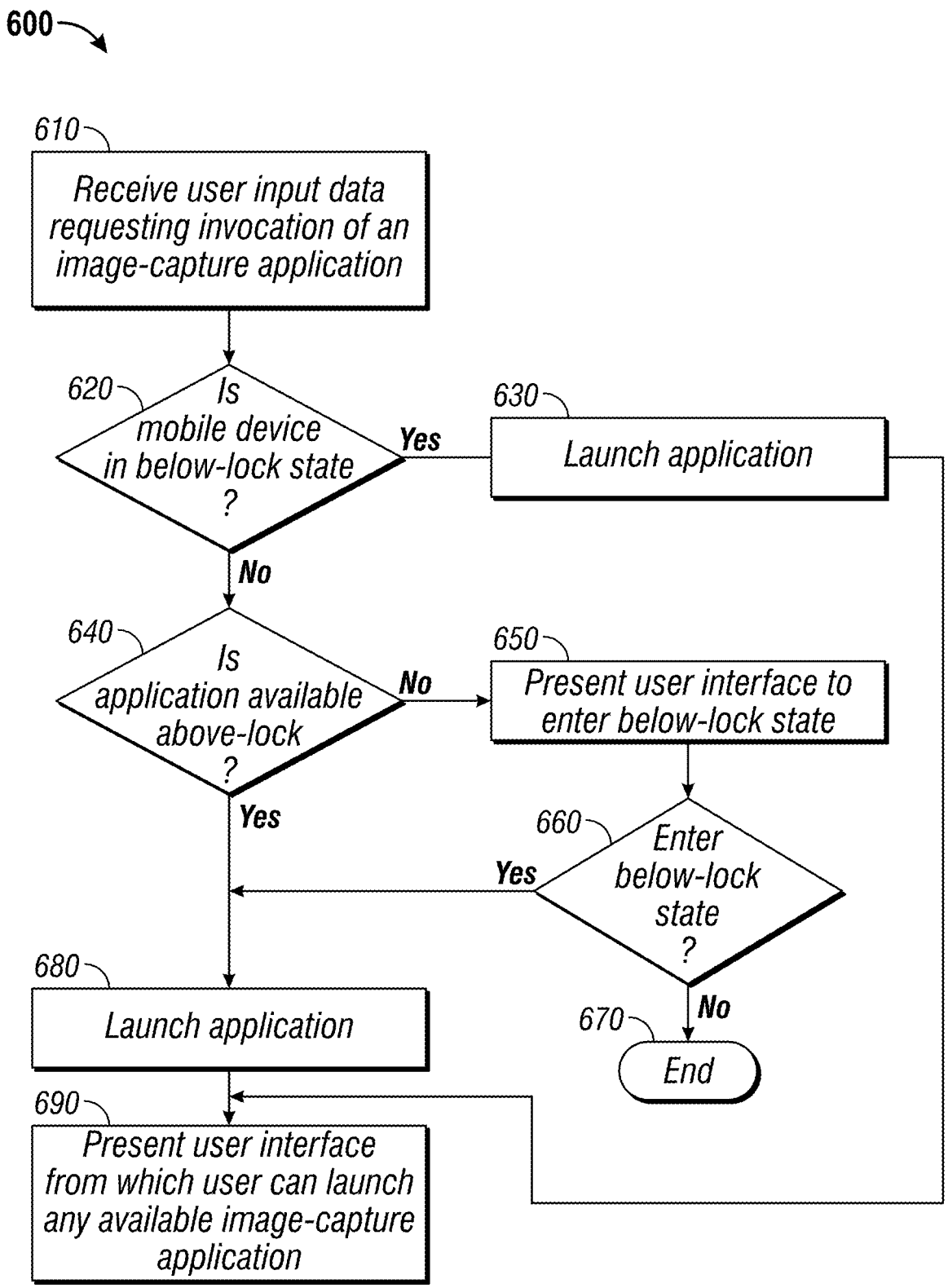
FIG. 9 is a flow chart that outlines an exemplary implementation of the disclosed technology.

FIG. 9 is a flow chart 600 that outlines an illustrative method of operating a mobile device having stored thereon a plurality image-related applications. At process block 610, user input data is received requesting invocation of an application. For example, a mobile device can receive input data from an input source such as one or more hardware buttons, a touch screen, a microphone, or a natural user interface. The application requested is an image-related application such as a camera or video capture application. At decision block 620 a determination is made as to whether the mobile device is in a below-lock or above-lock state. If it is in the below-lock state, the application is launched at block 630. If the device is in the above-lock state, a determination is made at block 640 as to whether a user or other party has designated the application as being one that is available above-lock. This designation may have been made by the user though an appropriate settings or options control. If the application is available above-lock, then the application is executed or launched at block 680. Even if the application is available above-lock, a user may have designated that only a subset of its functionality is to be made available. If the application is not available above-lock, at block 650 the user may be presented with a user interface through which the user has the option of entering the below-lock state. In some examples, the user interface may be a key, button, or a set of key presses or touch screen gestures on a touch-display. If the user does not enter the below-lock state, then the application cannot be executed and process ends at block 670. On the other hand, if the user decides to enter the below lock state, then the application is launched at block 680. Once the application is launched, then at block 690 the application presents a user interface from which the user can access any other available image-related application. The user interface may be, for example, a key, button, or a set of key presses or touch screen gestures on a touch-display.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved user experience with mobile devices, including mobile devices such as smart phones.

Any of the methods described herein can be performed via one or more non-transitory computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. For example, any technologies described herein for capturing still photos can also be adapted for capturing video. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

The invention claimed is:

1. A method of operating a mobile device having stored thereon a plurality of applications that are each configured to capture and/or process an image the method comprising:
receiving a user request through a first user interface in a launched first application to display previously-captured images, at least one of said previously-captured images being a rich media type image originally captured by a second application;

displaying the previously-captured images including rich media type images, the rich media type images stored in a rich media data format including basic image data and associated backing data used to render the rich media data type images, wherein the rich media type images are displayed via the launched first application in a format that does not include all of the rich media data; and providing a link with the basic image data for the at least one of said previously-captured rich media type images, the link invokes the second application that captured said previously-captured rich media type image, and displaying by the second application the rich media type image in a format that includes all of the rich media data format including basic image data and associated backing data.

2. The method of claim 1 further comprising presenting the first user interface on a touch screen of the mobile device.

3. The method of claim 2 in which the first user interface includes a virtual button.

4. The method of claim 3 in which the virtual button is presented by the first application.

5. The method of claim 1 wherein the basic image data is represented as a JPEG image.

6. The method of claim 5 wherein the basic image data and associated backing data are used to render a panoramic image.

7. The method of claim 5 wherein the basic image data and associated backing data are used to render a three-dimensional image.

8. The method of claim 1 in which the plurality of applications includes at least one native image-related application and at least one third party image-related application.

9. The method of claim 1 in which the first user interface is available for presentation to the user when the mobile device is in an above-lock state.

10. The method of claim 1 in which predetermined ones of the plurality of applications are unavailable when the mobile device is in an above-lock state.

11. The method of claim 1 in which activation of an application launch button from a user interface provides an indication of all of the plurality of image-related applications and which of the plurality of applications are unavailable when the mobile device is in an above-lock state.

12. The method of claim 1 in which one or more functions of the first application available in a below-lock state are unavailable to the user of the mobile device while the mobile device is in the above-lock state.

13. The method of claim 12 further comprising: receiving second input data requesting one of the unavailable functions; and based on the second input data, presenting a third user interface to the user operable to change the state of the mobile device to the below-lock state.

14. The method of claim 1 in which the first application is a third party application.

15. An apparatus, comprising:
an image capture device;
an apparatus user interface;
a plurality of stored applications;
one or more processors; and
one or more computer-readable storage media storing a plurality of image-related applications for capturing and/or processing an image, said computer readable storage media further storing computer-readable instructions that when executed by the processors, cause the apparatus to:

display, in response to a user request received by a first user interface in a first launched application to display previously-captured images, at least one of said previously-captured images being a rich media type image originally captured by a second application, wherein the rich media type images are stored in a rich media data format including basic image data and associated backing data used to render the rich media data type images, wherein the rich media type images are displayed via the launched first application in a format that does not include all of the rich media data; and provide a link with the basic image data for the at least one of the said previously-captured rich media type images, the link invokes the second application that captured said previously-captured rich media type image, and displaying by the second application the rich media type image in a format that includes all of the rich media data format including basic image data and associated backing data.

16. The apparatus of claim 15 in which the user interface provides a link to an application marketplace from which additional applications can be acquired.

17. The apparatus of claim 15 in which the image capture applications stored on the computer readable storage media include at least one third party image-related application, said computer readable storage media further storing computer-readable instructions that when executed by the processors, cause the apparatus to establish the third party image-related application as a default application in response to a user request received by the user interface.

* * * * *